(12) United States Patent
Fitzgerald

(10) Patent No.: US 7,552,930 B2
(45) Date of Patent: Jun. 30, 2009

(54) SNOW SLED

(75) Inventor: David J. Fitzgerald, Hayward, CA (US)

(73) Assignee: Wham-O, Inc., Emeryville, CA (US)

( * ) Notice: Subject to any disclaimer, the term of this patent is extended or adjusted under 35 U.S.C. 154(b) by 0 days.

(21) Appl. No.: 11/900,306

(22) Filed: Sep. 10, 2007

(65) Prior Publication Data
US 2008/0067764 A1    Mar. 20, 2008

Related U.S. Application Data

(63) Continuation of application No. 11/084,210, filed on Mar. 18, 2005, now abandoned.

(51) Int. Cl.
*B62B 13/16* (2006.01)

(52) U.S. Cl. .................... 280/16; 280/22.1

(58) Field of Classification Search .............. 280/15, 280/16, 17, 20, 21.1, 22.1, 26, 28.11, 28.16
See application file for complete search history.

(56) References Cited

U.S. PATENT DOCUMENTS

| | | | | |
|---|---|---|---|---|
| 3,482,848 A | * | 12/1969 | Hellstern | 280/16 |
| 3,638,960 A | * | 2/1972 | Eaton | 280/16 |
| 3,799,565 A | * | 3/1974 | Burtis et al. | 280/16 |
| 3,897,078 A | * | 7/1975 | Melnick et al. | 280/15 |
| 4,165,087 A | * | 8/1979 | Kagawa | 280/16 |
| 4,349,209 A | * | 9/1982 | Chilzer | 280/16 |
| 5,516,126 A | * | 5/1996 | Myers | 280/14.28 |
| 6,994,359 B1 | * | 2/2006 | Silver | 280/16 |

* cited by examiner

*Primary Examiner*—Frank B Vanaman
(74) *Attorney, Agent, or Firm*—James A. Fox; Ginger R. Dreger; Goodwin Procter LLP

(57) ABSTRACT

A snow sled for use by a seated rider includes a body section, a seat section having an underside for engaging the snow and a top side for receiving the seated rider, the seat section attached to the body section, a foot section having an underside for engaging the snow and positioned forward of the seat section when the snow sled is deployed in the riding configuration and positioned adjacent the seat section when the snow sled is retracted into the stowable configuration, and a handlebar arrangement connecting the body section to the foot section.

19 Claims, 6 Drawing Sheets

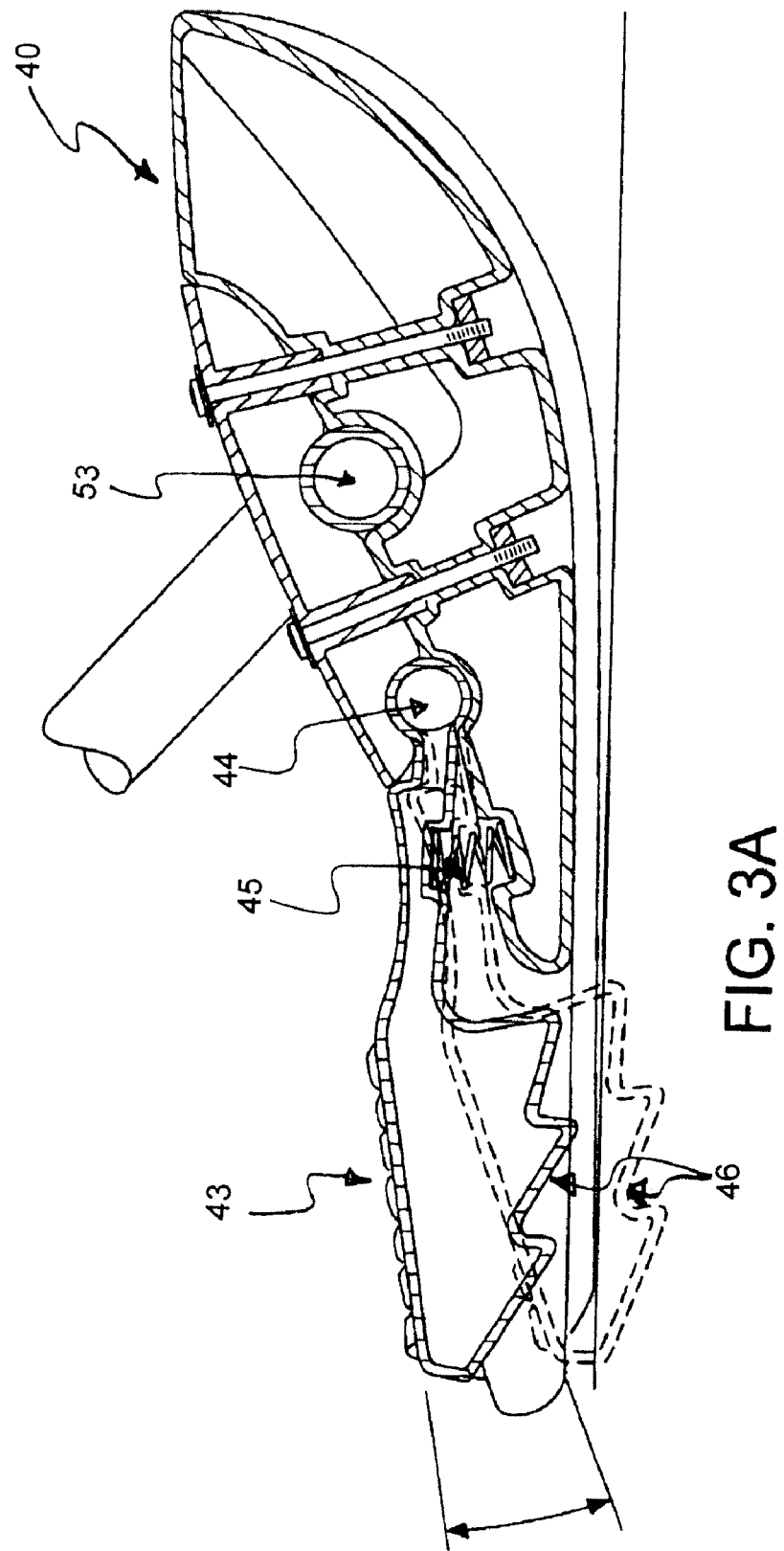

SNOW SLED

CROSS-REFERENCE TO RELATED APPLICATION

This application is a continuation of U.S. patent application Ser. No. 11/084,210, filed Mar. 18, 2005, now abandoned which is incorporated herein by reference in its entirety for all purposes.

BACKGROUND OF THE INVENTION

The present invention relates to snow sleds. More specifically, the present invention relates to snow sleds wherein the user rides the snow sled in an upright sitting position and the snow sled has steering capabilities. Children and adults alike enjoy the exhilaration of snow-sledding. Children and adults also have particular interests associated with various hobbies and interests such as race cars, space-ships, trains, and motorcycles. The illustrated embodiment in the present application, for example, takes the form of a chopper-style motorcycle—that is a motorcycle with long, backward-sloping forks and handlebars, a tear-shaped fuel tank, and a laid-back seating configuration. Embodiments of the present invention, however, are not limited to that of a motorcycle and can take the form of various shapes and configurations.

Two types of snow sleds are saucer sleds and the steel runner sleds. Saucer sleds are typically simple round plastic dishes with smooth bottoms and two handles. The user sits in a crouched position inside the dish and is limited to using the handles and the shifting of body weight for steering the saucer. Steering is difficult. Moreover saucer sleds are very plain in design. Steel runner sleds typically include parallel steel skates connected to a front steering bar and a top platform. Users typically either lie on their stomachs on the platform and use their hands to steer with the steering bar or they sit on the platform and use their feet to steer. Steel runner sleds can be dangerous because of the potential for the metal skates to run-over the user or an observer. Also because of their construction, steel runner sleds are heavy, typically plain in appearance, and difficult to transport and store.

SUMMARY OF THE INVENTION

The snow sled of the present invention includes a seat section, a body section, a handlebar arrangement, and a foot section. In some embodiments the seat section is rigidly attached to the body section; the handlebar arrangement is mounted to the body section and moveable relative thereto; and the foot section is mounted to the handlebar arrangement and moveable relative thereto. In such embodiments, the handlebar arrangement and body section connection may be configured such that when the snow sled is in a riding configuration, the foot section is positioned in front of the seat and body sections. To ride the snow sled when in the riding configuration, a user sits on the seat section, straddles the body section, places his or her feet on the foot section, and grips the upper end of the handlebar arrangement.

The handlebar arrangement and foot section connection may also be configured such that the handlebar arrangement and foot section can be positioned adjacent the body section and foot section, respectively, providing a retracted stowable configuration. The handlebar arrangement and foot section connection may be configured such that the foot section transitions smoothly over bumps in the snow when in the riding configuration and such that the foot section nests underneath the seat section when in the stowable configuration.

BRIEF DESCRIPTION OF THE DRAWINGS

FIG. 3A is a detail view of FIG. 3 showing the foot section and the operation of the brake.

DETAILED DESCRIPTION OF THE PREFERRED EMBODIMENT

Figure 1:
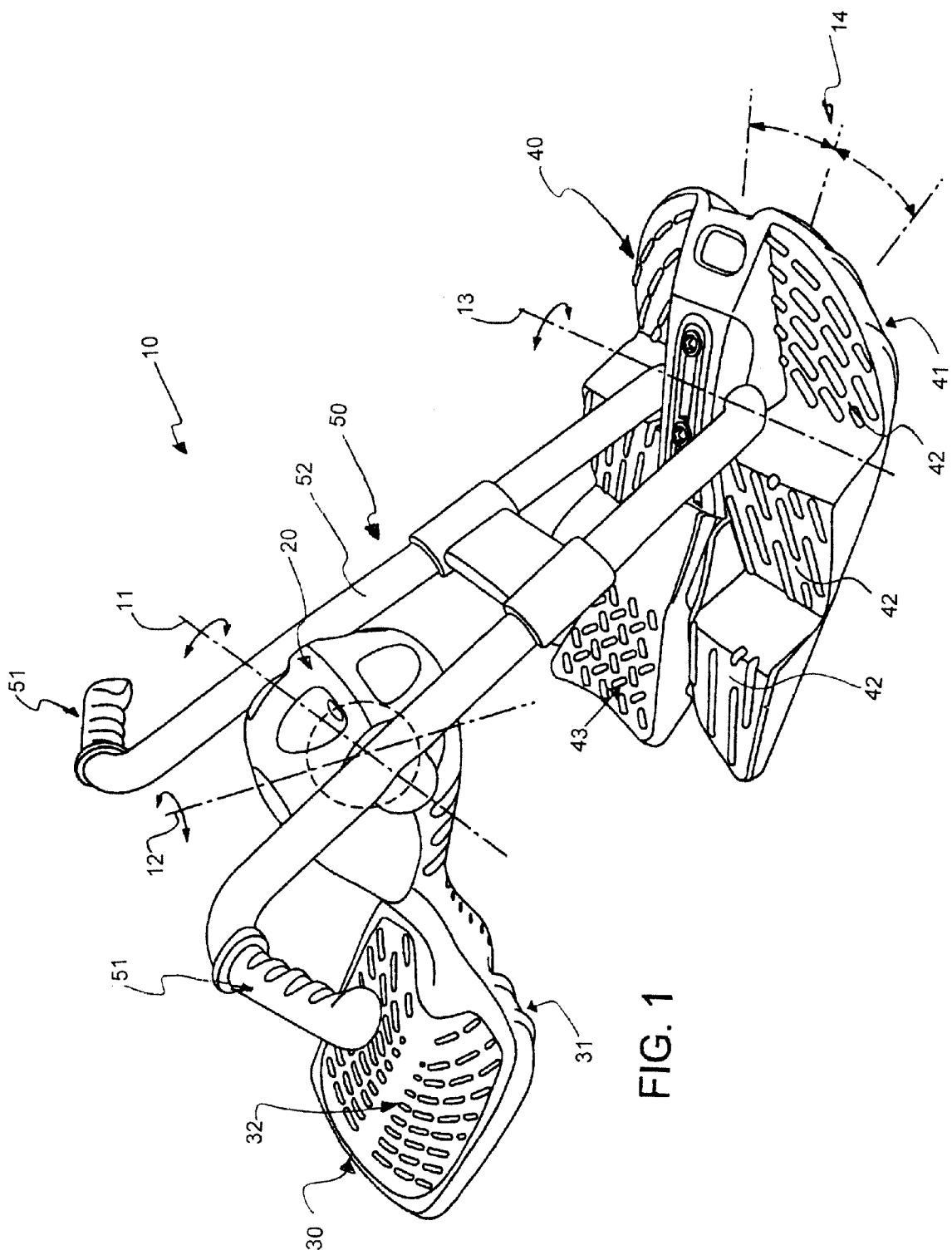
FIG. 1 is an isometric view of one embodiment of a snow sled showing relative movement of the various components.
Figure 2:
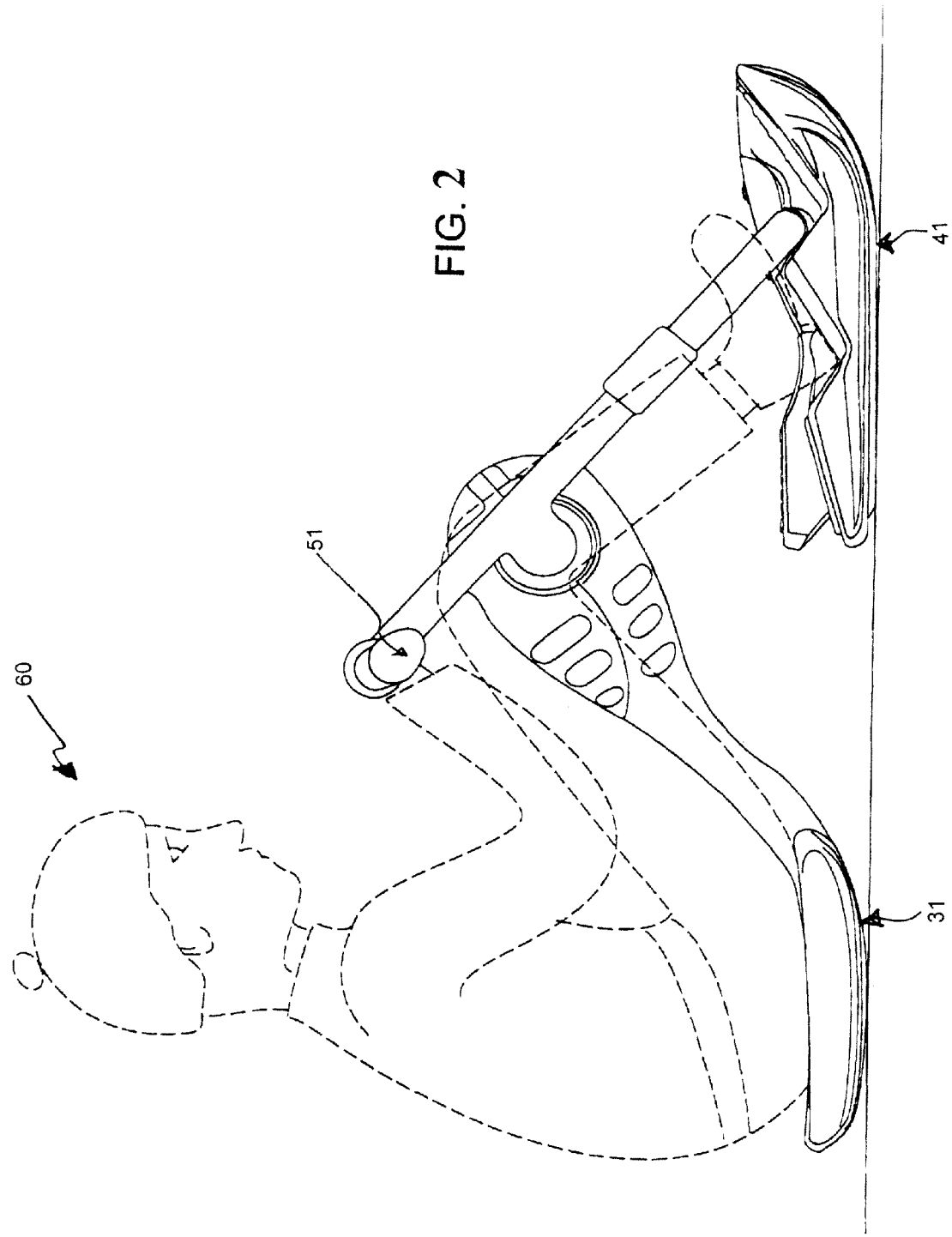
FIG. 2 is a side elevation of the snow sled of FIG. 1 showing a user seated on the sled.

As shown in FIGS. 1 and 2, a snow sled 10 according to the present invention, shown in the riding configuration, includes a body section 20, a seat section 30, a foot section 40, and a handlebar arrangement 50. The seat section 30 is attached to the body section 20 and has an underside 31 for engaging the snow and a top side 32 for receiving a seated rider 60. The foot section 40 has an underside 41 for engaging the snow and is positioned forward of the seat section when the snow sled is deployed in the riding configuration. The handlebar arrangement 50 is connected to the body section 20 and to the foot section 40. When seated on the snow sled 10, the rider 60 grips the handlebar arrangement 50 at hand grips 51 and places his or her feet atop the foot section 40.

In the preferred embodiment, as indicated in FIG. 1, the top side 32 of the seat section 30 includes raised ribs configured to grip the underside of the user 60. The underside 31 of the seat section 30 and the underside 41 of the foot section 40 include channels configured to direct the snow sled 10 in a generally forward direction.

Figure 3:
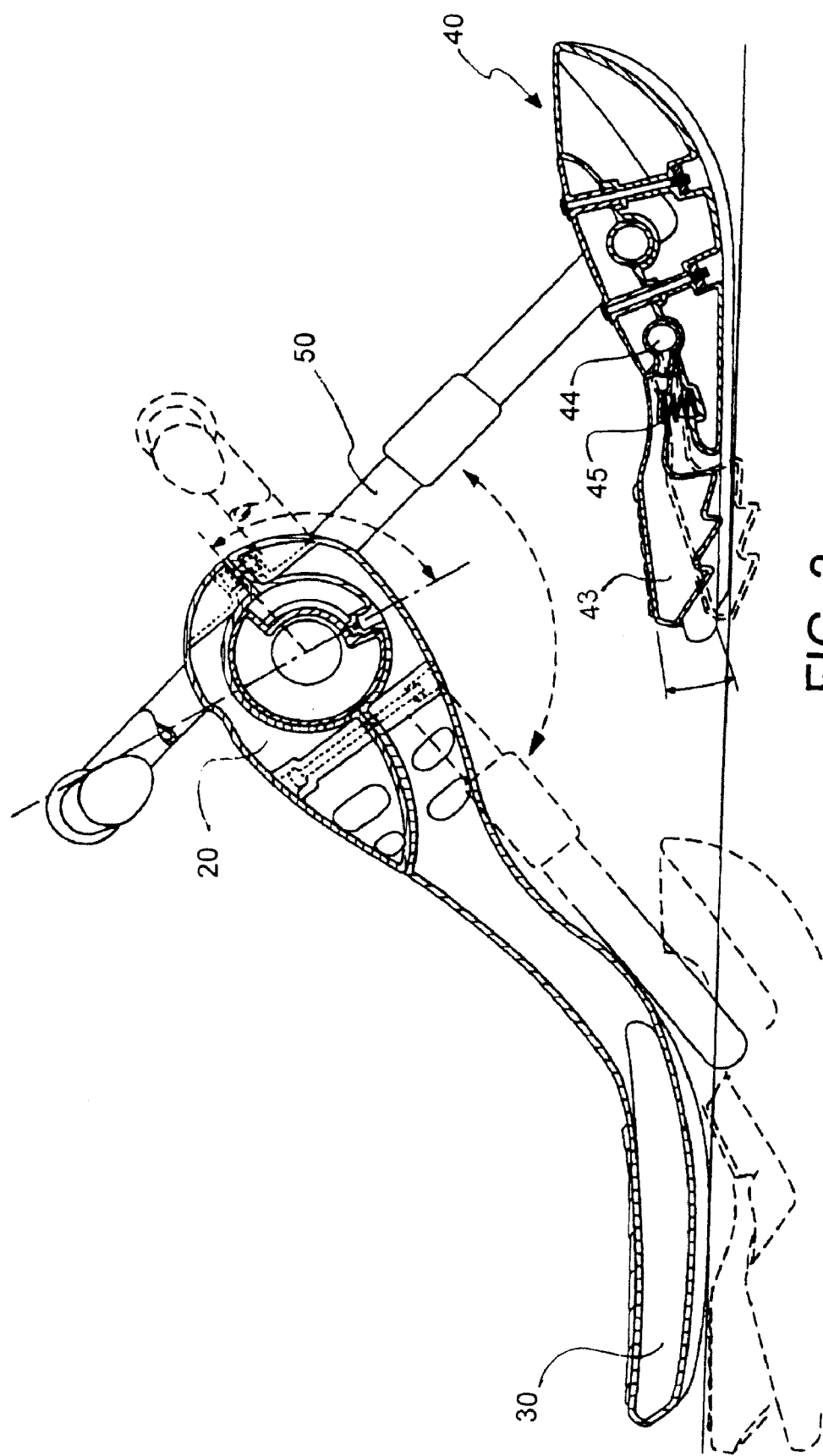
FIG. 3 is a cross-sectional view (along lines 3-3 of FIG. 1) showing how the sled is retractable from a riding configuration to a stowable configuration.

The handlebar arrangement 50 is mounted to the body section 20 and pivotable about axis 11 and mounted to the foot section 40. The foot section 40 is pivotable relative to the handlebar arrangement 50 about axis 13. The relative movement between the handlebar arrangement 50 and both the body section 20 and the foot section 40 allows for smooth transition over bumps in the snow while the snow sled 10 is being ridden and allows for a retracted stowable configuration as indicated in FIG. 3. In the stowable configuration the foot section 40 nests underneath and adjacent the seat section 30, and the handlebar arrangement 50 is positioned adjacent the body section. The handlebar arrangement 50 is also pivotably moveable relative to the body section about axis 12, as indicated in FIG. 1. This movement allows the rider 60 to steer the snow sled 10, directing the foot section 40 in the directions indicated generally at 14.

The foot section 40 includes multiple foot engagement positions 42 and a braking member 43. As shown in FIGS. 3 and 3A, the braking member 43 of the foot section 40 pivots about a connection 44. A spring 45 forces the braking member 43 in an upward direction preventing the bottom surface 46 of the braking member 43 from engaging the snow in a non-braking condition. The bottom surface 46 has a generally saw-tooth shaped profile configured to engage the snow when the rider 60 engages the top surface of the braking member 43 thus causing the spring 45 to compress and the bottom surface 46 to extend below the underside 41 of the foot section 40 in a braking condition. As shown in FIG. 1, the top surfaces of the braking member 43 and the foot engagement positions 42 include raised ribs configured to grip the underside of a rider's shoes.

Figure 4:
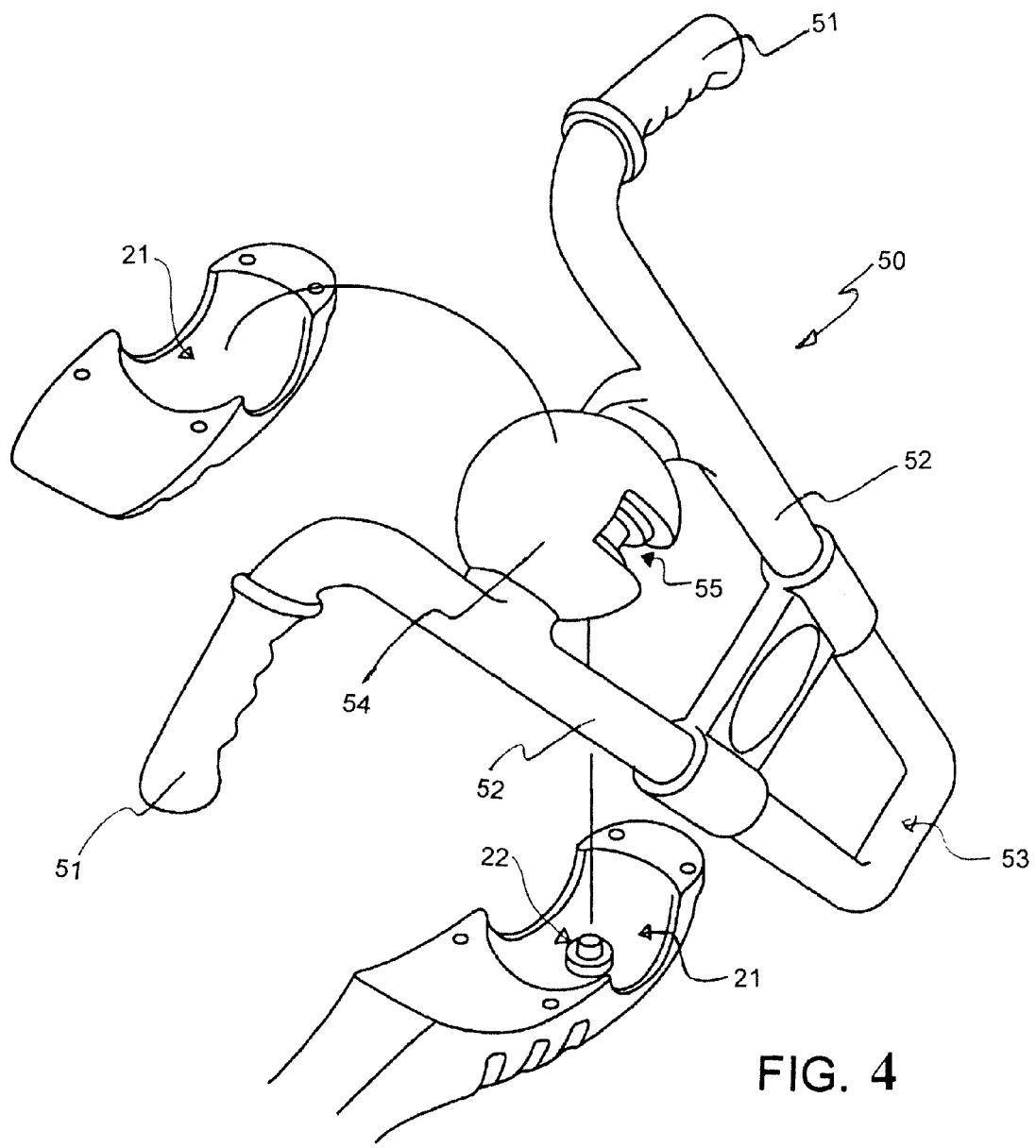
FIG. 4 is an exploded view of the body section and handlebar arrangement.

As shown in FIG. 4, the handlebar arrangement 50 includes elongated sections 52 terminating in hand grips 51 at the upper end and terminating in a pivot region 53 at the lower end. The handlebar arrangement 50 also includes a joint member 54 located generally between the elongated sections 52. The joint member 54 is generally spherical in shape and is received by mating surfaces 21 of body section 20. The handlebar arrangement 50 and body section 20 connection is configured such that the handlebar arrangement 50 rotates about an axis 11, indicated in FIG. 1, perpendicular to the snow sled direction and passing through the center of the joint member 54. The handlebar arrangement 50 also rotates about an axis 12, indicated in FIG. 1, and is described in more detail below.

Figure 3B:
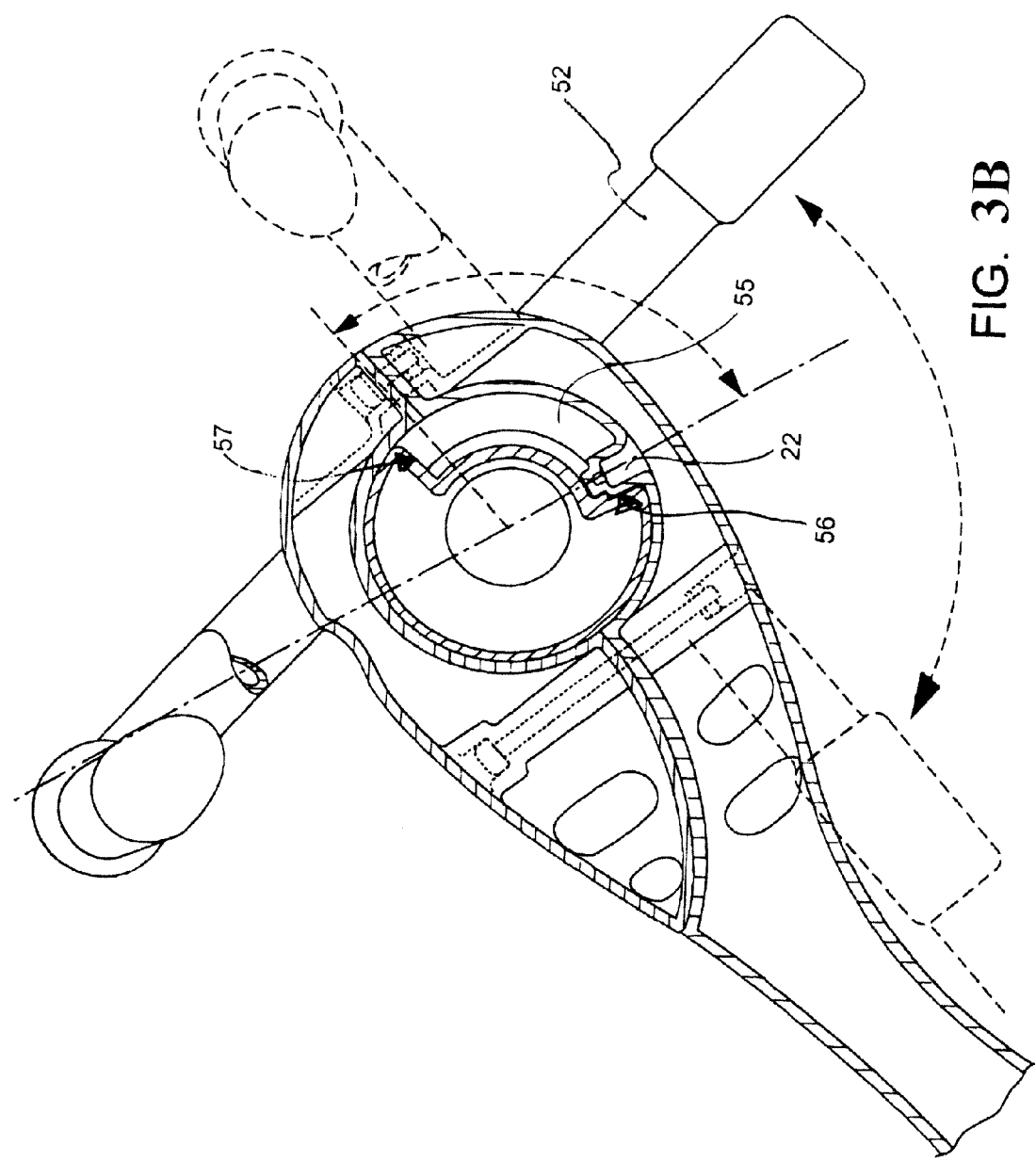
FIG. 3B is a detail view of FIG. 3 showing the body section and handlebar arrangement connection, and the relative movement of the handlebar arrangement between the riding configuration and the stowable configuration.

Referring now to FIGS. 3B and 4, to facilitate the multiple degrees of freedom of the handlebar arrangement 50 and body section 20 connection described above, the generally spherical joint member 54 includes a channel 55 located approximately from the plane formed by the elongated sections 52 and continuing for approximately one hundred degrees clockwise, when viewed from the right-hand side of the snow sled 10, about the generally spherical joint member 54. Also, the mating surface 21 of the body section 20 includes a cylindrical protrusion 22, the centerline of which forms the axis 12, indicated in FIG. 1, about which the handlebar arrangement can rotate to facilitate steering. The channel 55 includes a first channel section with a first width and a first depth and a second channel section with a second width less than the first width and a second depth greater than the first depth, depth being measured from the outer boundary of the generally spherical joint member 54, and wherein the first and second channel sections share a bisecting plane. The cylindrical protrusion 22 includes a first cylindrical section with a diameter equal to or slightly smaller than the width of the first channel section and a second cylindrical section with a diameter equal to or slightly smaller than the width of the second channel section. The first cylindrical section is configured such that the first channel section slides and rotates about the first cylindrical section, and the second cylindrical section is configured such that the second channel section slides and rotates about the second cylindrical section.

As shown in FIG. 3B, a first end 56 of channel 55 abuts the cylindrical protrusion 22 when the snow sled 10 is in the riding configuration. A second end 57 of channel 55 abuts the cylindrical protrusion 22 when the snow sled 10 is in the stowable configuration.

While the invention has been disclosed in its preferred form, the specific embodiment thereof as disclosed and illustrated herein are not to be considered in a limiting sense, as numerous variations are possible. Applicant regards the subject matter of the invention to include all novel and non-obvious combinations and subcombinations of the various elements, features, functions and/or properties disclosed herein. No single feature, function, element or property is essential to all of the disclosed invention.

What is claimed is:

1. A snow sled for use by a seated rider, and having a riding configuration for carrying said rider, the snow sled comprising: a body section; a seat section, having an underside for engaging the snow and a top side for receiving the seated rider, the seat section attached to the body section; a foot section having an underside for engaging the snow and positioned forward of the seat section when the snow sled is deployed in the riding configuration; and a handlebar arrangement connecting the body section to the foot section,
wherein the handlebar arrangement includes: elongated sections, the elongated sections terminating in hand grips at first ends; a pivot region, the pivot region integrally connecting the elongated sections at second ends and pivotally attached to the body section; and a joint member, the joint member located generally between the elongated sections and integral thereto and configured to attach to the body section,
wherein the joint member is generally spherical; and wherein the body section includes an interior mating surface configured to mate with the joint member.

2. The snow sled of claim 1, wherein the handlebar arrangement is mounted to the body section and moveable relative thereto for positioning the foot section so that it is nested underneath the seat section thereby providing a retracted stowable configuration of the snow sled.

3. The snow sled of claim 2, wherein the foot section is mounted to the handlebar arrangement and moveable relative thereto.

4. The snow sled of claim 1, wherein the handlebar arrangement is pivotably mounted to the body section for positioning the foot section adjacent the seat section; and wherein the foot section is pivotably mounted to the handlebar arrangement for positioning the foot section so that it is nested underneath the seat section, thereby providing a retracted stowable configuration of the snow sled.

5. The snow sled of claim 1, wherein the foot section includes more than one foot engagement position.

6. The snow sled of claim 5, wherein the more than one foot engagement positions include gripping surfaces.

7. The snow sled of claim 6, wherein the gripping surfaces are raised ribs.

8. The snow sled of claim 5, wherein the foot section further includes a brake system.

9. The snow sled of claim 8, wherein the brake system includes a pivotally attached braking member, the braking member including: a top surface, and a bottom surface.

10. The snow sled of claim 9, wherein the brake system further includes a spring configured to pivot the braking member generally upward so the bottom surface does not engage the snow when the spring is in an extended condition.

11. The snow sled of claim 10, wherein the top surface of said braking member includes raised ribs.

12. The snow sled of claim 10, wherein the bottom surface has a generally saw-tooth shaped profile configured to engage the snow when the rider engages the top surface causing the spring to compress.

13. The snow sled of claim 1, wherein the handlebar arrangement and body section connection allows for rotation of the handlebar arrangement relative to the body section about more than one axis.

14. The snow sled of claim 13, having a snow sled direction generally along a line of travel of said snow sled, wherein the handlebar arrangement defines a plane generally corresponding to a plane including the elongated sections of the handlebar arrangement, and includes a joint member; and wherein the more than one axis includes: an axis perpendicular to the snow sled direction and passing through the center of the joint member; and an axis parallel to the plane defined by the handlebar arrangement and passing through the center of the joint member.

15. The snow sled of claim 1, wherein the joint member includes a channel, and wherein the interior mating surface includes a protrusion configured to mate with the channel.

16. The snow sled of claim 15, wherein the channel includes: a first channel section with a first width and a first depth, and a second channel section with a second width less than the first width and a second depth greater than the first depth, depth being measured from the outer boundary of the generally spherical joint member, wherein the first and second channel sections share a bisecting plane; and wherein the protrusion includes: a first cylindrical section configured to slide and rotate within the first channel section; and a second cylindrical section configured to slide and rotate within the second channel section.

17. The snow sled of claim 15, wherein the channel has a first end, wherein said first end is located at a position approximately along the plane formed by the elongated sections of said handlebar arrangement, and wherein said channel continues for approximately one hundred degrees clockwise from said plane, when viewed from the right-hand side of the snow sled, about the joint member.

18. The snow sled of claim 17, wherein the top surface of the seat section is configured to grip the underside of a user.

19. The snow sled of claim 18, wherein the top surface of the seat section includes raised ribs.

* * * * *